United States Patent [19]
Etienne

[11] 4,187,436
[45] Feb. 5, 1980

[54] DEVICE FOR REGULATING THE SOURCE OF ELECTRIC ENERGY ON A HYBRID ELECTRIC VEHICLE

[75] Inventor: Michel Etienne, Valmondois, France
[73] Assignee: Automobiles Peugeot, Paris, France
[21] Appl. No.: 867,838
[22] Filed: Jan. 9, 1978

[30] Foreign Application Priority Data
Jan. 12, 1977 [FR] France .............................. 76 00749

[51] Int. Cl.² .............................................. B60L 11/12
[52] U.S. Cl. ................................... 290/27; 180/65 R; 290/50; 318/139; 322/38; 290/45
[58] Field of Search ........................... 180/65 A, 65 R; 318/139; 322/38; 290/7, 29, 45, 50; 320/62 Y

[56] References Cited
U.S. PATENT DOCUMENTS

| | | | |
|---|---|---|---|
| 1,790,634 | 1/1931 | Arendt | 290/10 |
| 1,790,635 | 1/1931 | Arendt | 290/10 |
| 3,503,464 | 3/1970 | Yardney | 180/65 A |
| 3,719,881 | 3/1973 | Shibata et al. | 290/50 |
| 3,732,751 | 5/1973 | Berman et al. | 180/65 A |
| 3,792,327 | 2/1974 | Waldorf | 290/16 |
| 3,991,357 | 11/1976 | Kaminski | 290/50 |
| 4,042,056 | 8/1977 | Horwinski | 290/13 |

Primary Examiner—Gene Z. Rubinson
Assistant Examiner—John W. Redman
Attorney, Agent, or Firm—Burns, Doane, Swecker & Mathis

[57] ABSTRACT

Device for regulating the source of electric energy on a hybrid electric vehicle comprising at least an electric motor for driving the driving wheels of the vehicle and supplied with current by said source of energy and a generating set comprising a heat engine with which there is associated a current generator supplying current to said source of electric energy. This device comprises a circuit for determining the state of charge of the source of electric energy, a circuit for controlling the excitation winding of the generator of the generating set in accordance with the state of charge of said source, and a logic circuit for operating and stopping the heat engine and controlled by said circuit determining the state of charge of said source of electric energy.

7 Claims, 9 Drawing Figures

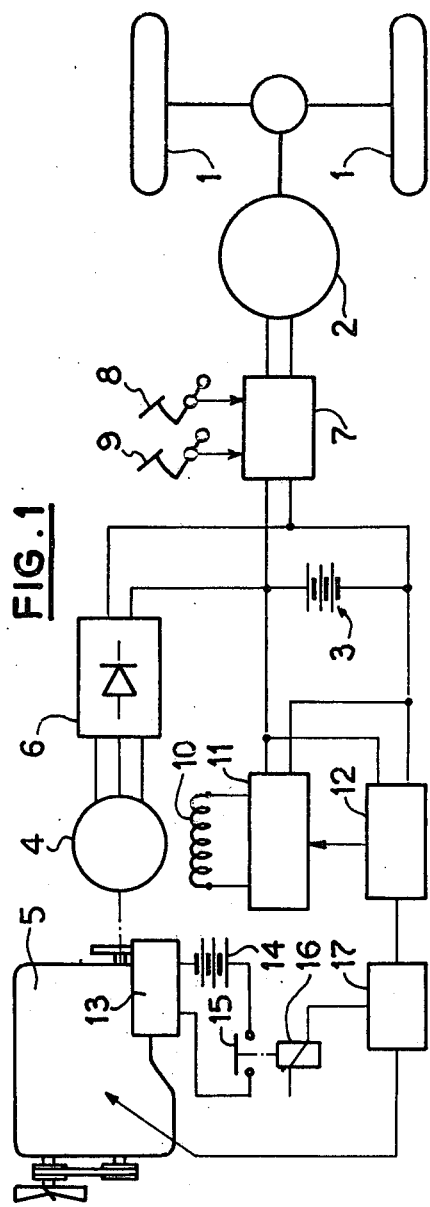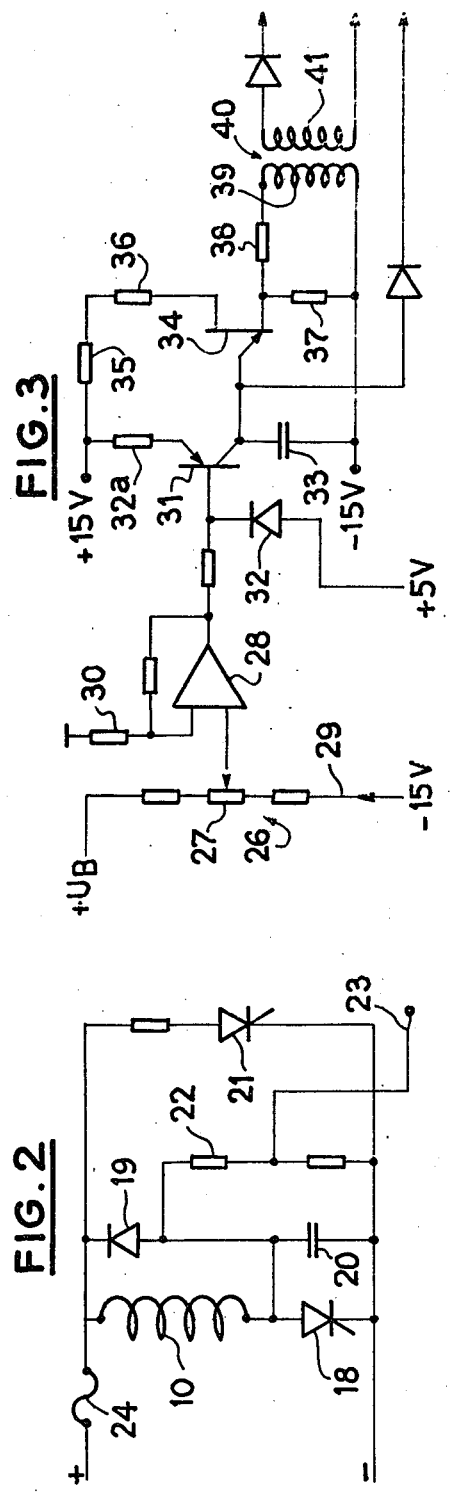

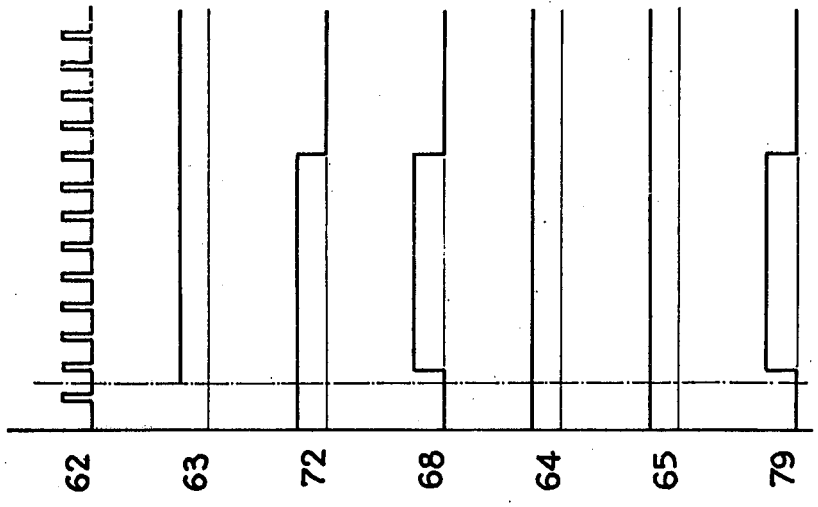
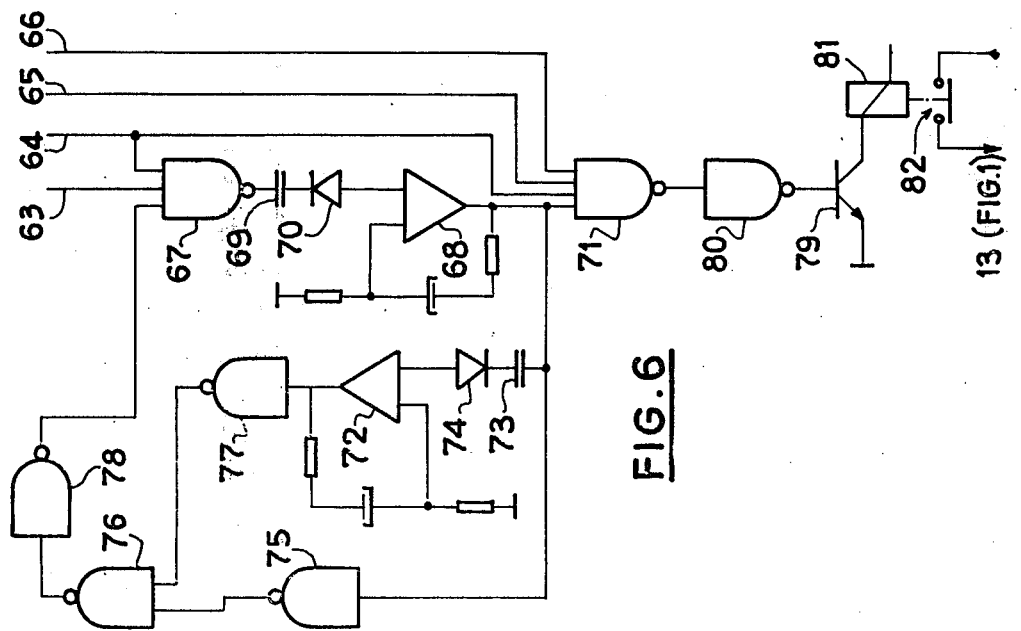

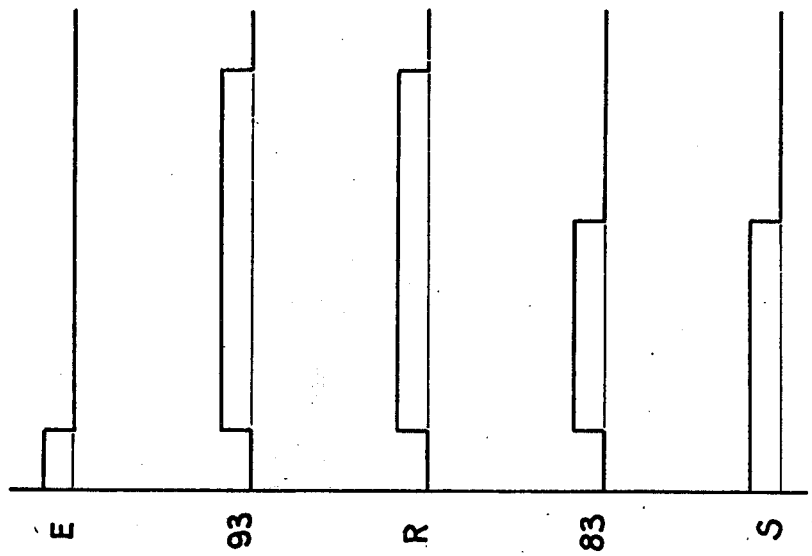
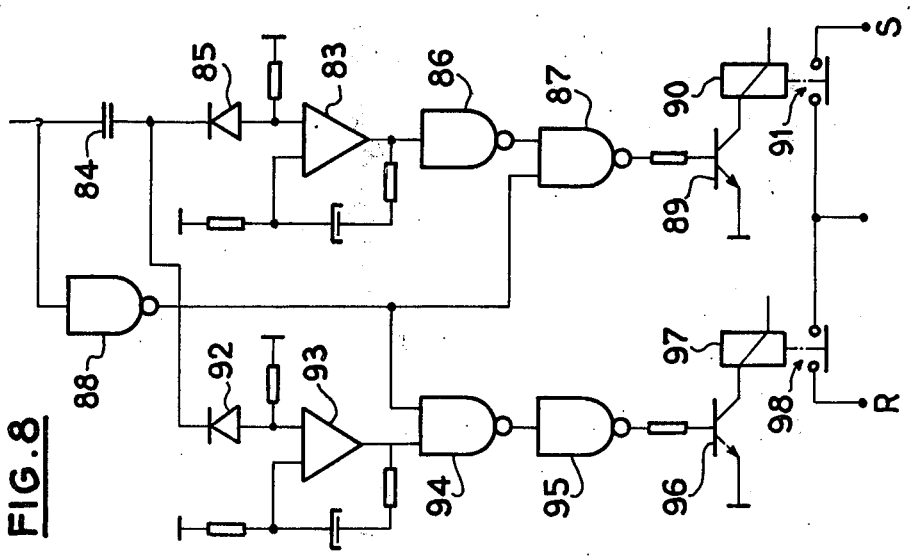

DEVICE FOR REGULATING THE SOURCE OF ELECTRIC ENERGY ON A HYBRID ELECTRIC VEHICLE

The present invention relates to a device for regulating the source of electric energy on a hybride or mixed-drive electric vehicle comprising at least an electric motor for driving the driving wheels of the vehicle and supplied with current by said source of energy and a generating set comprising a heat engine with which there is associated a current generator supplying current to said source of electric energy.

A regulating device of this general type is disclosed in Swiss Pat. No. 479,418. This device comprises a circuit for determining the state of charge of the battery and an automatic device for operating and stopping the heat engine driving a generator.

The object of the invention is to provide a regulating device for regulating the source of electric energy on a hybride electric vehicle having driving wheels, comprising at least an electric motor for driving the driving wheels of the vehicle and supplied with current by said source of energy, and a generating set comprising a heat engine and a current generator which has an excitation winding and is combined with the heat engine and a first circuit connecting the generator to said source for supplying current to said source, a second circuit for determining the state of charge of said source, a device for operating and stopping the heat engine, and a third circuit associated with the excitation winding of the generator for controlling said winding as a function of the state of charge of said source, the device for operating and stopping the heat engine comprising a logic circuit controlled by said second circuit.

Further features of the invention will be apparent from the ensuing description with reference to the accompanying drawings which are given solely by way of example:

FIG. 1 is a block diagram of the regulating device according to the invention;

FIG. 2 is a more detailed electric circuit diagram of the excitation circuit of the alternator of the device shown in FIG. 1;

FIG. 3 is an electric diagram of the circuit for regulating the excitation circuit shown in FIG. 2;

FIG. 6 shows an embodiment of the control logic of the starter of the device shown in FIG. 1;

FIG. 7 is a diagram showing the signals at certain points of the circuit shown in FIG. 6;

FIG. 8 shows an embodiment of the logic circuit for stopping the heat engine, and FIG. 9 is a diagram showing the form of the signals at a number of points of the circuit shown in FIG. 8.

Figure 4:
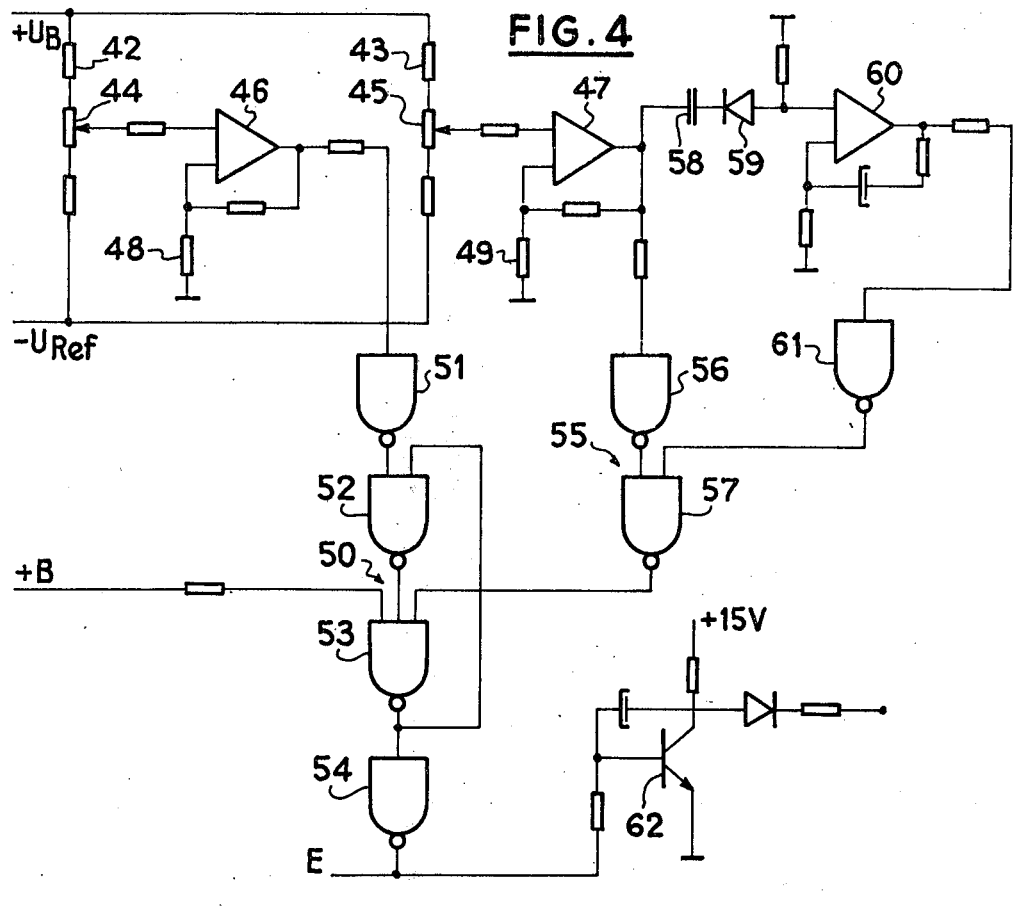
FIG. 4 is a logic circuit of the detection of the state of the battery of the device shown in FIG. 1.

The device shown in FIG. 1 is a device for regulating the source of electric energy of a hybrid electric vehicle whose driving wheels 1 are driven by an electric driving motor 2 supplied with current by a battery 3 the charging of which is ensured by an alternator 4 which is driven by a heat engine 5, said alternator being connected to the battery 3 through a rectifier unit 6.

The electric motor 2 is connected to the battery through a control circuit 7 on which the user may act by means of an accelerator pedal 8 and a brake pedal 9.

The alternator 4 comprises an excitation winding 10 controlled by an excitation circuit 11 which is connected to the terminals of the battery 3 and is itself controlled by a circuit 12 which ascertains the state of the battery 3.

A heat engine 5 is associated with a starter 13 which is supplied with current by a separate battery 14 to which it is connected in series with a switch 15 controlled by a relay coil 16 connected to a logic circuit 17 for stopping and operating the engine 5.

The circuit shown in FIG. 2 is the excitation circuit of the alternator.

The excitation winding 10 of the alternator is connected in series with a thyristor 18 to the terminals of the battery 3, the cathode of the thyristor being connected to the negative terminal of the battery.

The anode of the thyristor 18 is connected at the common points of a diode 19 and a capacitor 20 which are connected in series to the terminals of the battery 3.

The thyristor 18, the diode 19 and the capacitor 20 constitute a signal generator.

Connected in parallel with the diode 19 and the capacitor 20 is a thermal protection thyristor 21, whereas connected to the terminals of the capacitor 20 there is a voltage divider 22 whose intermediate terminal is connected to the output 23 of the charge safety.

The circuit is completed by a fuse 24 which is connected in series with the excitation winding 10.

The regulating circuit shown in FIG. 3 comprises mainly a voltage divider 26 connected to the positive terminal of the battery 3 and to a source of negative voltage, for example $-15$ V.

This voltage divider 26 comprises a potentiometer 27 whose slide is connected to an input of a differential amplifier 28 also connected through a conductor 29 to an excitation stopping control circuit (not shown). The other input of the amplifier 28 is connected to earth through a resistor 30. The output of the amplifier 28 is connected to the base of a P-N-P transistor 31 which is connected to a positive source of voltage of, for example $+5$ V through a diode 32.

The emitter of the transistor 31 is connected to a source of positive voltage, for example $+15$ V, through a resistor $32^a$ whereas the collector thereof is connected to a source of negative voltage through a capacitor 33.

The collector of the transistor 31 is also connected to the control electrode of the unijunction transistor 34 which is moreover connected between a source of positive voltage and a source of the same type of negative voltage through resistors 35, 36 and 37 respectively.

Connected in a series to the terminals of the resistor 37 are a resistor 38 and a primary winding 39 of a transformer 40 whose secondary winding 41 is connected to the control electrode of the thyristor 18 of the circuit shown in FIG. 2.

FIG. 4 shows in the logic form the circuit for determining the state of the battery shown at 12 in FIG. 1.

This circuit comprises mainly two voltage dividers 42 and 43 which are connected in parallel to the positive terminal of the battery 3.

Each divider comprises a potentiometer 44, 45 whose slide is connected to an input of a corresponding comparator 46, 47.

The comparator 46 is adapted to designate the low level of the voltage of the battery whereas the comparator 47 is adapted to designate the high level by means of a stable reference voltage $U_{ref}$ applied to the terminals of the two voltage dividers 42, 43 opposed to those connected to the battery.

The other inputs of the comparators 46 and 47 are connected to earth through corresponding resistors 48, 49.

The output of the comparator 46 is connected to a memory 50 comprising, in the presently-described embodiment, an inverter 51, an inverting AND gate having two inputs 52, one of which is connected to the output of the inverter 51, an inverting AND gate 53 having three inputs one input of which is connected to the output of the gate 52 and an output which is connected to the input of another inverter 54.

The output of the gate 53 is furthermore re-injected into the input of the gate 52 which is other than that connected to the gate 51.

The gate 53 further comprises an input connected to the positive terminal of the battery and an input connected to the output of an adder circuit 55 formed by an inverter 56 connected to the output of the comparator 47 and an inverting AND gate 57 connected between the inverter 56 and the gate 53 of the memory 50.

The output of the comparator 47 is furthermore connected, through a capacitor 58 and a diode 59 in series, to an input of a monostable circuit 60 whose output is connected, through an inverter 61, to the other input of the gate 57 of the adder circuit 55.

The output of the inverter 54 of the memory 50 constitutes the state output of the battery for connection to the circuit 17 of the device shown in FIG. 1.

It is connected to the base of a transistor 62 whose collector is connected to the conductor 29 of the amplifier 28 of the circuit shown in FIG. 3.

The circuit shown in FIG. 6 comprises a clock input 63, a battery state input 64, an alternator voltage input 65 and an alternator temperature input 66.

The clock input 63 is connected to an input of an inverting AND gate 67 having three inputs of which another input is connected to the battery state input 64, the output of the gate 67 being connected to an input of a monostable circuit 68 through a capacitor 69 and a diode 70 in series.

The output of the circuit 68 is connected to an input of an inverting AND gate having four inputs 71 the three other inputs of which are constituted by the inputs 64, 65 and 66 of the circuit.

The output of the circuit 68 is furthermore connected to the input of a monostable circuit 72 through a capacitor 73 and a diode 74 and connected directly to the input of an inverter 75. The output of the circuit 73 is connected to an input of an inverting AND gate 76 through an inverter 77 whereas the output of the inverter 75 is directly connected to the other input of the gate 76.

The output of the gate 76 is connected to the third input of the gate 67 through an inverter 78.

The output of the AND gate 71 having four inputs is connected to the base of a transistor 79 through an inverter 80.

The emitter-collector circuit of the transistor 79 is connected in series with a winding 81 of a relay 82 controlling the starter 13 of the heat engine 5 (FIG. 1).

The circuit shown in FIG. 8 is the circuit controlling the stopping of the heat engine in accordance with the state of the battery 3.

This circuit comprises mainly an input connected to the output of the circuit 12 determining the state of the battery 3 shown in FIG. 1 or, to the output of the circuit shown in FIG. 4 which is an embodiment of the circuit 12 shown in FIG. 1.

The input of the circuit shown in FIG. 8 is connected to an input of a monostable circuit 83 through a capacitor 84 and a diode 85 connected in series. The output of the circuit 83 is connected through an inverter 86 to an input of an inverting AND gate 87 having two inputs. The other input of the gate 87 is connected to the input of the circuit through an inverter 88 whereas its output is connected to the base of a transistor 89 whose emitter collector path is connected to the terminals of a source of direct voltage in series with the winding 90 of a relay 91 controlling the stopping of the heat engine 5 (FIG. 1).

The input of the circuit is connected in a similar manner through a capacitor 84 and a diode 92 to the input of a second monostable circuit 93 whose triggering threshold is lower than that of the circuit 83.

The output of the circuit 93 is connected to an input of a gate 94 having two inputs the other input of which is connected to the output of the inverter 88 and the output of which is connected through an inverter 95 to the base of a transistor 96 whose emitter-collector path is connected in series with the winding 97 of a relay 98 controlling the idling speed of the heat engine 5.

The relays 91 and 98 are both inserted in the circuit of the battery of the heat engine.

The device just described operates in the following manner:

The battery 3 of the device shown in FIG. 1 has to be maintained in a state for supplying the peak driving power for driving the motor 2.

This peak power must be able to be supplied when the state of the battery is between a high level corresponding to a 20% discharge and a low level corresponding to a 80% discharge.

It is therefore necessary to permanently supervise the voltage of the battery so as to start up the generating set constituted by the heat engine 5 the alternator 4 and the rectifiers 6 as soon as the battery 3 reaches the aforementioned low level.

The output of the alternator is a function of the voltage across the terminals of the battery which pilots the regulation of the excitation of the alternator in a manner which will be described with reference to FIGS. 2 and 3.

The thyristor 18 regulates the current of the excitation winding 10 of the alternator. For this purpose, it is triggered by the circuit 12 determining the state of the battery shown in FIG. 1.

If the temperature of the alternator is too high, the thyristor 21 is triggered and causes the fuse 24 to melt which breaks the supply circuit of the winding 10.

The regulation of the excitation of the alternator wil now be described with reference to FIG. 3.

In a first stage, the alternator 4 charges the battery 3 with constant excitation and follows its external characteristic, the generating set operating at constant speed. The base of the transistor 31 of the circuit shown in FIG. 3 is blocked at a positive voltage which is applied thereto through the diode 32. The capacitor 33 charges and discharges at a constant rhythm in the unijunction component 34 which triggers the thyristor 18 (FIG. 2) through the transformer 40 and consequently the supply of current to the excitation winding 10 of the alternator.

The excitation current is therefore constant.

As the battery 3 is being charged, the voltage $U_B$ increases.

The amplifier 28 amplifies the difference between the voltage of the battery and a constant voltage applied to the opposite terminals of the voltage divider 26.

The base of the transistor 31 increases in voltage so that the current of the collector of the transistor decreases and the capacitor 33 is charged more slowly. Consequently, the relaxation frequency decreases in the same way as the intervals of conduction of the thyristor 18.

Consequently, the excitation of the alternator 4 is decreased so that the charging current of the battery decreases and can be cancelled out if the voltage of the battery becomes sufficient.

The maximum value of the excitation current so regulated is such that the heat engine is never overloaded.

The circuit 12 for determining the state of the battery must furnish the information of the state of the battery 3 to the excitation circuit 11 of the alternator and also to the logic circuit 17 for operating and stopping the heat engine 5 of the generating set.

Figure 5:
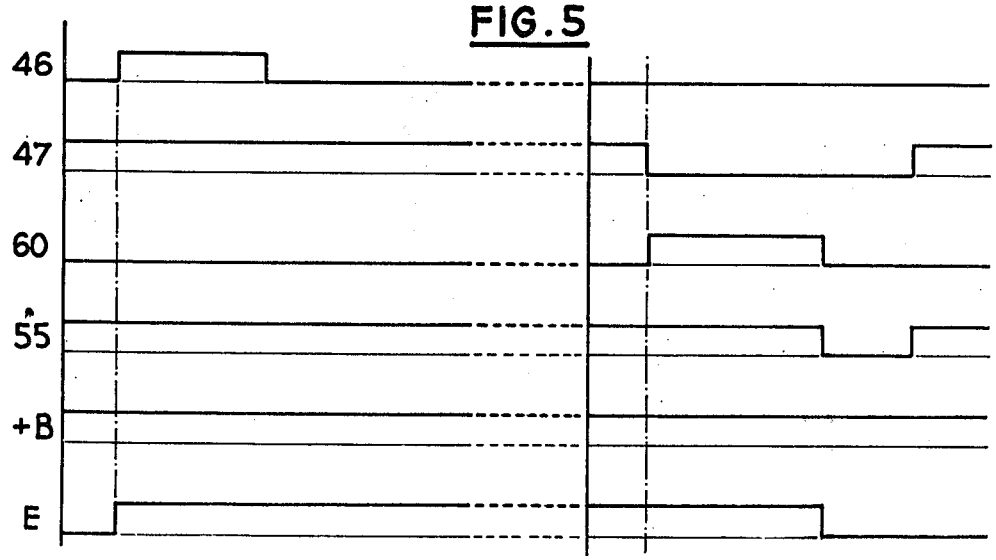
FIG. 5 is a diagram showing the signals at certain points of the circuit shown in FIG. 4.

This circuit is shown in FIG. 4 and the operation thereof will now be described with reference to FIGS. 4 and 5.

The two comparators 46 and 47 respectively detect the low level and high level of the voltage $U_B$ of the battery 3 by means of a stable reference voltage $U_{ref}$.

When the voltage of the battery is lower than the low level given by the divider 42, the comparator 46 delivers at its output a positive voltage which passes through the memory 50 so that at the output of the latter there appears a logic signal $E=1$ indicating that the battery 3 must be recharged.

This signal is applied to the engine operating and stopping circuit 14 the operation of which will be described hereinafter.

As the charge level of the battery 3 increases, the voltage $U_B$ increases and the comparator 46 delivers a negative voltage which does not affect the state E since the memory 50 retains the first information.

When the upper level, corresponding to the practically fully charged battery, is reached, the comparator 47 delivers a negative voltage. The monostable circuit 60 stores the information during several seconds and the adder 55 only allows through the information if the comparator 47 has not changed state during this time of storage of the information by the circuit 60 (FIG. 5).

Such an operation is rendered necessary in order that in the course of a regenerative braking which raises the voltage of the battery, the generating set is not made to stop.

When the adder 55 allows through the information relating to the high level reached by the battery, the memory 50 changes state so that a logic state $E=0$ appears at its output and causes the stoppage of the generating set through the circuit shown in FIG. 8.

The logic circuit controlling the starter 13 of the device shown in FIG. 1 is illustrated in FIG. 6.

To actuate the starter, three conditions must be satisfied.

The voltage of the alternator 4 must be zero, which shows that the generating set does not operate.

The temperature of the alternator must be lower than a dangerous value for the machine.

The state of the battery must be such that the battery must be charged. This state corresponds to $E=1$ at the output of the circuit shown in FIG. 4.

The operation of the circuit shown in FIG. 6 is illustrated by the diagram of FIG. 7.

The purpose of the circuit 68 is to control the duration of the starting up. The circuit 72 is adapted to control the time which elapses between two consecutive startings.

The gate 71 controls the starter 13 (FIG. 1) when the three aforementioned conditions are satisfied and the starting order is transmitted by the circuit 68.

This order can only reach the winding 81 of the relay 82 if the signal $E=1$ is at the input 64 of the circuit shown in FIG. 6.

Permission to start or to re-start is given by the gate 76.

This permission can only be given by the circuit 72 for the first starting and thereafter if the time or pause between two consecutive startings has elapsed.

When the output of the circuit shown in FIG. 4 changes to the state $E=0$ indicating that the battery 3 of the vehicle is sufficiently charged, the heat engine 5 of the generating set must be stopped.

The circuit shown in FIG. 8 ensures this stopping. When the input signal E of this circuit changes to the logic 0 state, the output of the circuits 93 and 83 changes to the logic 1 state (FIG. 9).

The output signal of the circuit 83 is inverted by the inverter 86 and then applied to the gate 87 which receives at its other input the signal E inverted by the inverter 88.

During the presence at its inputs of the two aforementioned signals, the gate 87 produces a signal which prevents the supply of current to the winding 90 of the relay 91. Simultaneously, the state E of the input of the circuit is applied to the input of the monostable circuit 93 which changes to 1 state. Its output signal is applied to an input of the gate 94 which receives at its other input the signal E which is inverted and in turn produces a signal which, after inversion by the inverter 95, causes the supply of current to the winding 97 of the idling speed relay 98.

The closing time of the relay 98 exceeds the closing time of the relay 91 so that before the engine stopping signal appears at S (FIG. 9), a given interval of time elapses in the course of which the heat engine 5 operates at idling speed.

Upon stoppage of the heat engine, the battery 3 supplies current to the motor 2 until its discharge requires a new intervention on the part of the generating set.

At this moment, the cycle of operation of the regulating device is resumed.

Having now described my invention what I claim as new and desire to secure by Letters Patent is:

1. A regulating device for regulating the source of electric energy on a hybrid electric vehicle having driving wheels, comprising at least an electric motor for driving the driving wheels of the vehicle and supplied with current by said source of energy, and a generating set comprising a heat engine and a current generator which has an excitation winding and is combined with the heat engine and a first circuit connecting the generator to said source for supplying current to said source, a second circuit for determining the state of charge of said source, a device for operating and stopping the heat engine, and a third circuit associated with the excitation winding of the generator for controlling said winding as a function of the state of charge of said source, the device for operating and stopping the heat engine comprising a logic circuit controlled by said second circuit, wherein said second circuit comprises means providing a reference voltage and means for detecting a low level and means for detecting a high level of the voltage of said source relative to said reference voltage, means for memorizing an electric signal corresponding to a level of voltage of said source which is lower than said low level and means for erasing the information contained in said memory connected to an output of said means for detecting the high level of a voltage of the source of energy.

2. A device as claimed in claim 1, wherein said means for detecting the high and low levels of the voltage of said source comprise a voltage divider which is connected between said source and the means providing the reference voltage, and comparators each having an input which is connected to the voltage divider.

3. A device as claimed in claim 1, wherein said means for erasing the information of the low level contained in said memory comprise an adder having an input connected directly to an output of said means for detecting the high level and another input connected to the output of said means for detecting the high level through a circuit storing the information of the low level during a predetermined period of time.

4. A device as claimed in claim 1, wherein said third circuit comprises a controlled rectifier having a control electrode and connected in series with said excitation winding and a circuit for regulating the excitation of the generator and connected to the control electrode of the controlled rectifier, the circuit for regulating the excitation comprising a transistor having a base, an emitter, a collector and an emitter-collector path, a capacitor, a unijunction transistor, a transformer, a voltage divider having a moving terminal and fixed terminals, means providing a reference voltage, a differential amplifier having an input connected to the moving terminal of the voltage divider and an output, the fixed terminals of the voltage divider being respectively connected to said source and to the means providing the reference voltage, the output of the amplifier being connected to the base of the transistor whose emitter-collector path is connected in series with the capacitor, the collector of the transistor being connected to the unijunction transistor which is itself connected to the control electrode of the control rectifier through the transformer.

5. A device as claimed in claim 4, comprising a fuse interposed between said source and the excitation winding of the generator, a thyristor for thermal protection of the alternator connected in parallel with the excitation winding of the generator and the controlled rectifier,
    conduction of the thermal protection thyristor causing the opening of said fuse.

6. A device as claimed in claim 1, comprising a starter for the heat engine, the device for operating and stopping the heat engine comprising a logic circuit combined with the starter of the heat engine for controlling the starter as a function of the state of said source, of the output voltage of the generator and of the temperature of said generator, and a logic circuit for stopping the heat engine when the state of charge of said source has reached a predetermined level, said device further comprising a supply circuit for the starter, a relay for closing said supply circuit, said logic circuit for controlling the starter comprising a first monostable circuit for controlling the duration of the starting effectd by the starter, a second monostable circuit for controlling an interval of time between two consecutive startings and an AND gate for controlling the starter when the voltage of the generator is zero and the temperature of the generator is lower than a predetermined value and the state of the charge of said source requires a starting up of the heat engine, said AND gate controlling said supply circuit for the starter.

7. A device as claimed in claim 6, wherein the logic circuit for stopping the heat engine comprises a first monostable circuit for forming an interval of time during which the heat engine must operate at idling speed, a gate having an input connected to the monostable circuit and an input connected to state of charge input of said source, the output signal of said gate constituting an order to operate the heat engine at idling speed and a second monostable circuit having an output and for forming an interval of time less than the interval of time formed by the first monostable circuit, a second gate having an input connected to the output of the second monostable circuit and an input connected to the state of charge input of said source, the output signal of the second gate constituting an order to stop the heat engine.

* * * * *

UNITED STATES PATENT AND TRADEMARK OFFICE
CERTIFICATE OF CORRECTION

PATENT NO. : 4,187,436
DATED : February 5, 1980
INVENTOR(S) : Michel ETIENNE

It is certified that error appears in the above-identified patent and that said Letters Patent are hereby corrected as shown below:

On the first page, under "Foreign Application Priority Data", after "Jan. 12, 1977 [FR] France ......." delete "76 00749" and insert therefor --77 00749--.

Signed and Sealed this

Fifth Day of August 1980

[SEAL]

Attest:

SIDNEY A. DIAMOND

Attesting Officer

Commissioner of Patents and Trademarks